(12) United States Patent
Pursifull (10) Patent No.: US 8,534,403 B2
(45) Date of Patent: Sep. 17, 2013

(54) CNG-FUELED VEHICLE WITH FUEL TANKS PACKAGED BETWEEN CAB AND BED

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1089 days.

(21) Appl. No.: 12/239,505

(22) Filed: Sep. 26, 2008

(65) Prior Publication Data

US 2010/0078244 A1   Apr. 1, 2010

(51) Int. Cl.
*B60K 15/03* (2006.01)
*B60K 15/063* (2006.01)

(52) U.S. Cl.
USPC .......................... 180/69.5; 180/314

(58) Field of Classification Search
USPC ............... 180/69.5, 89.1, 89.11, 312, 313, 180/314; 280/1, 830; 296/37.6, 97.22, 146.1, 296/190.08, 193.01, 193.03
See application file for complete search history.

(56) References Cited

U.S. PATENT DOCUMENTS

| | | | | |
|---|---|---|---|---|
| 3,001,825 | A * | 9/1961 | Rouse | 298/8 R |
| 3,664,704 | A * | 5/1972 | Ellis | 296/37.6 |
| 4,599,780 | A * | 7/1986 | Rohrbacher | 29/401.1 |
| 4,861,096 | A * | 8/1989 | Hastings | 296/183.1 |
| 4,991,906 | A * | 2/1991 | Fingerle | 296/180.2 |
| 5,033,567 | A * | 7/1991 | Washburn et al. | 180/89.12 |
| 5,301,997 | A * | 4/1994 | Cudden | 296/182.1 |
| 5,316,358 | A * | 5/1994 | Payne et al. | 296/37.6 |
| 5,518,272 | A * | 5/1996 | Fukagawa et al. | 280/834 |
| 5,658,013 | A * | 8/1997 | Bees et al. | 280/831 |
| 5,934,397 | A * | 8/1999 | Schaper | 180/65.245 |
| 5,951,233 | A * | 9/1999 | Boucher et al. | 414/495 |
| 6,257,360 | B1 * | 7/2001 | Wozniak et al. | 180/69.5 |
| 6,676,163 | B2 * | 1/2004 | Joitescu et al. | 280/834 |
| 6,957,847 | B2 * | 10/2005 | Rigel | 296/190.02 |
| 7,219,941 | B1 * | 5/2007 | San Paolo et al. | 296/37.6 |
| 7,393,045 | B1 * | 7/2008 | Gonzalez | 296/190.04 |
| 7,744,127 | B2 * | 6/2010 | Essinger et al. | 280/830 |

FOREIGN PATENT DOCUMENTS

JP   11062712   * 3/1999

OTHER PUBLICATIONS

Musial, R. "Can-do Attitude Motivates Midbox Inventors", Ford World, Sep. 10, 2007, p. 10.

* cited by examiner

*Primary Examiner* — J. Allen Shriver, II
*Assistant Examiner* — Bridget Avery
(74) *Attorney, Agent, or Firm* — Julia Voutyras; Alleman Hall McCoy Russell & Tuttle LLP (57) ABSTRACT

A vehicle, a system, and a method are disclosed for providing the vehicle configured to operate on Compressed Natural Gas (CNG) with CNG storage tanks. An example vehicle may include a cab including an engine compartment. An engine may be configured to operate on a gaseous fuel and may be located in the engine compartment. The vehicle may include a bed, and a mid-box positioned between the cab and the bed. The mid-box may include at least one storage tank configured to store the fuel in a compressed, or a compressed liquid state. The vehicle may include a fueling system configured to supply fuel from the at least one storage tank to the engine.

14 Claims, 6 Drawing Sheets

CNG-FUELED VEHICLE WITH FUEL TANKS PACKAGED BETWEEN CAB AND BED

BACKGROUND/SUMMARY

Operating a vehicle on Compressed Natural Gas (CNG) has numerous advantages. For example exhaust gases may be cleaner. In some markets it may be cheaper to operate a vehicle using CNG verses other fuels such as gasoline. A challenge arises in converting existing vehicles to contain the CNG tank and fuel fill door (on bi-fuel vehicles).

One proposal to locate a CNG tank on a pickup truck would mount one or two tanks directly to the wall, or floor, of the pickup bed.

However, the inventors herein have recognized several issues with such approaches. As one example, gaining access to the CNG tank(s) to refuel the pickup truck may be difficult, and may require reaching over the bed wall, or climbing onto the bed. In addition, this approach may tend to give the pickup truck an unfinished "aftermarket solution" appearance.

Thus, in one example, the above issues may be addressed by providing a vehicle, such as a pick up truck including a cab including an engine compartment. An engine may be configured to operate on a gaseous fuel and may be located in the engine compartment. The vehicle may include a bed, and a mid-box positioned between the cab and the bed. The mid-box may include at least one storage tank configured to store the fuel in a compressed state. The vehicle may include a fueling system configured to supply fuel from the at least one storage tank to the engine. In this way, it may be possible to take advantage of already available vehicle manufacturing configurations and available tooling, while also providing a finished look and easy re-fueling accessibility.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
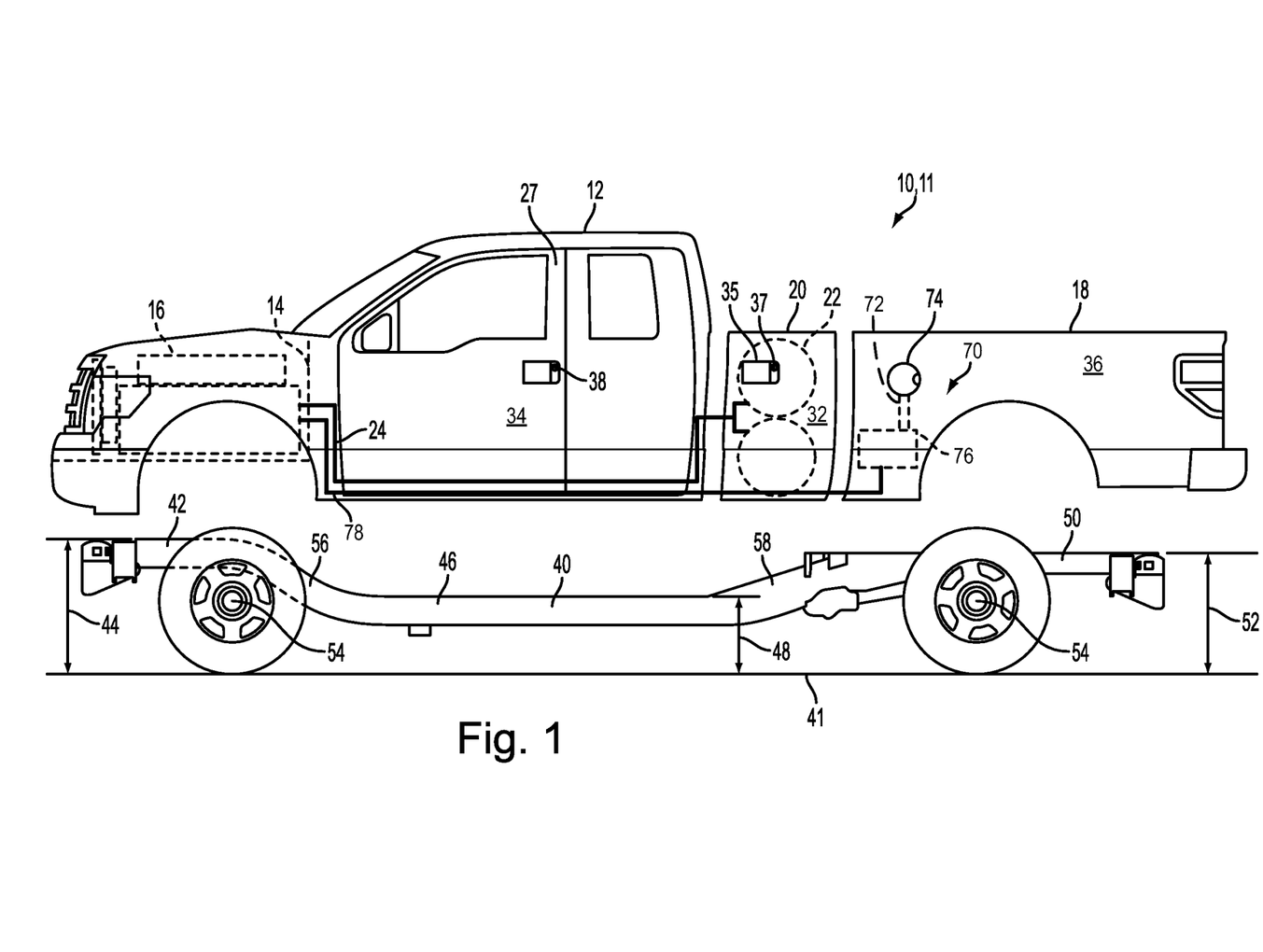
FIG. 1 is an exploded side view of a vehicle.

FIG. 1 is an exploded side view of a vehicle 10. The vehicle 10 may be for example a pickup truck 11 as illustrated in this example embodiment. The vehicle 10 may include a cab 12 including an engine compartment 14. An engine 16 may be configured to operate on a gaseous fuel. The engine 16 may be located in the engine compartment 14. The vehicle 10 may include a bed 18 that may be configured to receive, and hold, objects to be transported by the vehicle 10. A mid-box 20 may be positioned between the cab 12, and the bed 18. The mid-box 20 may include at least one storage tank 22 configured to store the fuel in a compressed state. The compressed state may be a compressed liquid state, or simply a compressed state. The example illustrated shows two storage tanks 22. A fueling system 24, illustrated here schematically with a dark line, may be configured to supply fuel from the at least one storage tank 22 to the engine 16. The fueling system may include elements such as a fuel line, valves and so forth. In one example, the compressed fuel may be compressed natural gas (CNG). Other gaseous fuels may be used, for example propane, or hydrogen, or others.

In some examples, engine 16 may be configured to operate on more than one type of fuel, for example, the engine 16 may be a bi-fuelled engine 16 configured to operate on the gaseous fuel and a liquid fuel. The liquid fuel may be, for example, one or more of gasoline, diesel, ethanol, and the like. The vehicle may have a liquid fuel system 70 including a liquid fuel receiving unit 72 including a fuel door 74 that may be positioned in a bed side body panel 36 of the bed 18. The receiving unit 72 may be coupled with a fuel tank 76 configured to store the liquid fuel, and to provide the liquid fuel to the engine 16 via a fuel line 78 illustrated schematically with a dark line. The liquid fuel system 70 may also include elements such as a fuel pump, and a fuel filter, and the like.

The vehicle 10 may include a pair of rails 40. The rails 40 may be part of a framework, or frame, to support various components of the vehicle 10. One rail 40 is shown in FIG. 1. The other rail 40 is hidden in behind the rail 40 shown. The rails 40 may be longitudinal structural elements that may include different portions disposed at respective different heights above a surface 41 such as the ground, or a road surface. The different portions may be configured to support different vehicle components at the different heights. For example, a first rail portion 42 may support, the engine compartment 14 portion of the cab 12 at a first height 44, the second rail portion 46 may support the cab 12 at a second height 48 and the third rail portion 50 may support the bed 18 at a third height 52. The engine compartment 14 and the 18 bed may be at the same or similar height which may be high enough to clear the wheel axles 54. The second height 48, e.g. of the cab 12, may be at a lower than the first height 44, and/or the third height 52 which may make it easier for a driver, and/or passengers to enter and exit the cab 12. In some embodiments rails of substantially consistent height may be used.

The different rail portions may be connected by frame spanning elements. For example, a front spanning element 56 may connect the first rail portion 42 to the second rail portion 46, and a rear spanning element 58 may connect the second rail portion 46 to the third rail portion 50. The spanning elements 56 and 58 may be, for example, angled or curvilinear.

In some embodiments the mid-box 20 may be coupled to the bed 18. In other embodiments the mid-box may be coupled to the cab 12.

Figures 2, 3:
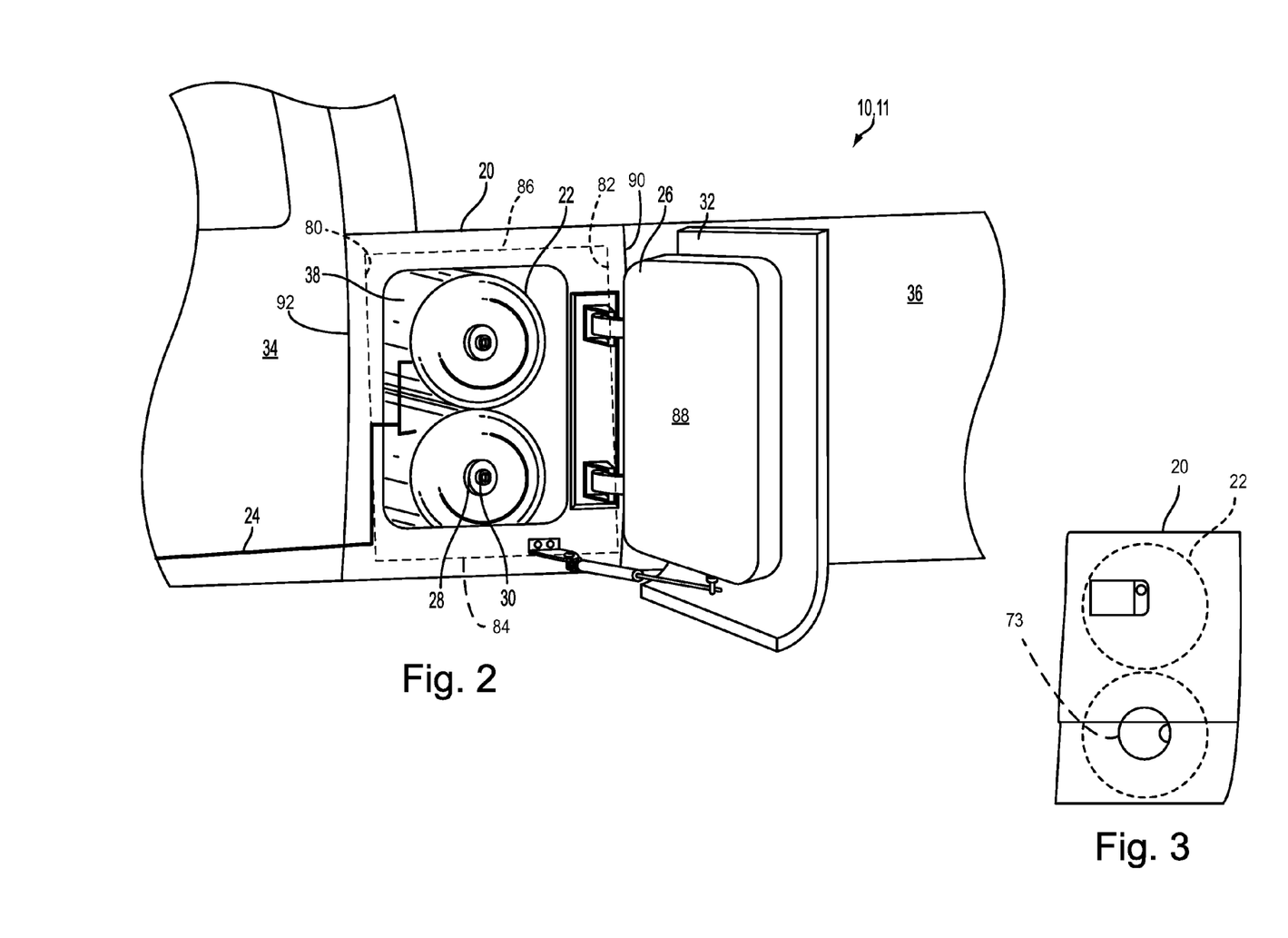
FIG. 2 is a perspective view showing a portion of one side of the pickup truck including a mid-box in accordance with the disclosure.
FIG. 3 is a side view of another example mid-box.

FIG. 2 is a perspective view showing a portion of one side of the pickup truck illustrated in FIG. 1. The mid-box 20 may have a mid-box side body panel 32 positioned between and bordered by a cab side body panel 34, and a bed side body panel 36. The mid-box side body panel 32 may form a door 26, or part of the door, thereby providing access to the gaseous fuel receiving unit 28. The mid-box 20 door 26, is shown here in an opened state.

The fueling system 24 may further include a gaseous fuel receiving unit 28 located inside the mid-box 20. The gaseous fuel receiving unit 28 may be configured to be accessed from inside mid-box 20 when the side opening door 26 is opened. The gaseous fuel receiving unit 28 may be coupled to the storage tank 22 to supply fuel received by the gaseous fuel receiving unit 28 to the at least one storage tank 22. The gaseous fuel receiving unit 28 may include a CNG fill port 30. The CNG fill port 30 may be configured to couple with a CNG supply source. The CNG supply source may be from, for example, a fueling station, or a household supply line. Each of the storage tanks 22 may include its own CNG fill port 30. In some examples a single CNG fill port 30 may be coupled with all of the at least one storage tank 22 via, for example, a manifold.

Some example embodiments may have an opening door 26 on both sides of the vehicle 10. Some examples may include a CNG fill port 30 on both sides. In this way refueling may be made easier. Some examples may include a CNG fill port 30 accessible without opening the door 26. In examples having a door 26 on only one side of the vehicle a stationary mid-box side body panel 32 may be used.

FIG. 3 is a side view of another example mid-box 20 having a relatively smaller port access door 73 to allow access to a CNG fill port 30. The port access door 73 may appear similar to the fuel door 74 shown in FIG. 1.

Returning again to FIG. 2, the at least one storage tank 22 may include at least a cylindrically-shaped section 39. The at least one storage tank 22 may be transversely mounted in the mid-box 20. Various numbers of storage tanks 22 having various diameters and various lengths may be positioned in the mid-box 20. Many example storage tanks 22 may have a length substantially equal to a depth of the mid-box and may approach the width of the vehicle 10. In one embodiment one or more 5 foot long, transversely-mounted CNG tanks may be disposed in the mid-box 20.

The mid-box may include a front wall 80, a back wall 82, bottom surface 84, a top surface 86, and two side walls 88. One of the side walls 88 may be configured with the first door 26 providing access to a refueling inlet, for example the receiving unit 28 discussed above. The refueling inlet may also, or instead, include the port access door 73, also discussed above, and an inflow pipe etc. The other side wall 88 (not visible in this view) may be configured with a second door 26. The back wall 82 of the mid-box 20 may be positioned adjacent a front wall 90 of the bed 18, and the front wall 80 of the mid-box 20 may be positioned adjacent a rear wall 92 of the cab 12.

Referring again to FIG. 1, the door 26 may include a latch 35 to keep the door 26 closed and a lock 37 to ensure the door 26 remains closed except when opened by someone authorized to open the door 26, such as an owner of the vehicle. The lock 37 may be opened with a mechanical, and/or electronic key that may also open the cab door 27 via cab door lock 38. The same key may also operate the vehicle ignition switch. In some embodiments the keys may be different.

The mid-box side body panel 32 may be colored, for example painted, to match the cab side body panel 34, and the bed side body panel 36. The mid-box side body panel 32 may also, or alternatively, be shaped to form a substantially continuous panel with the cab side body panel 34 and bed side body panel 36. In this way the vehicle 10 may have a continuous, unified appearance and/or may have desirable aerodynamic qualities.

Figure 4:
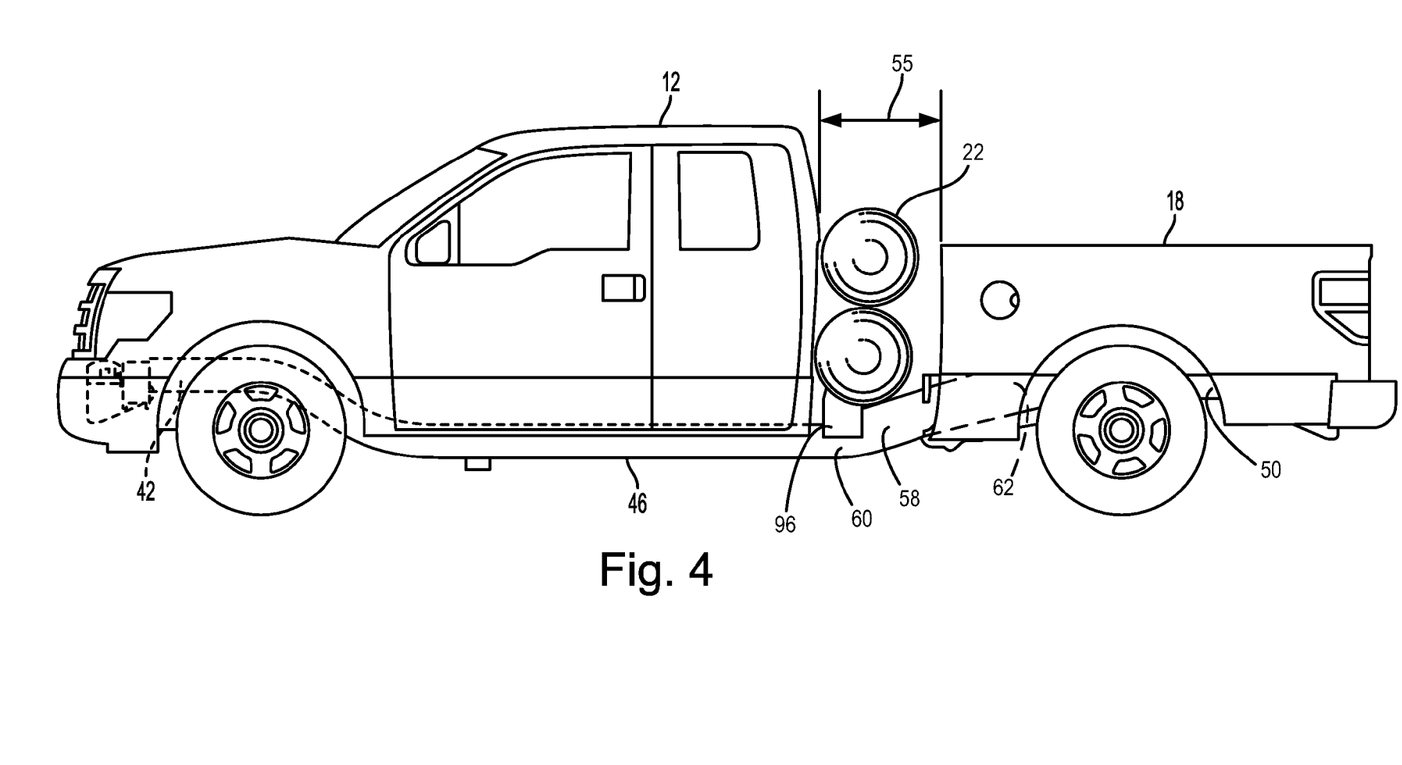
FIG. 4 is a side view with the external structure of the mid-box removed to show CNG storage tanks in place relative to other vehicle components.

FIG. 4 is a side view with an external structure of the mid-box removed to show CNG storage tanks in place relative to other vehicle components. The cab 12 may be attached to the first rail portion 42, and to the second rail portion 46. The bed 18 may be attached to the third rail portion 50 with a space therebetween. The bed 18, may be positioned a distance 55 away from the cab 12. At least one storage tank 22 that may configured to store the fuel in a compressed, and/or a compressed liquid state may be positioned between the bed 18 and the cab 12 within the distance 55. The mid-box 20 may be positioned within the distance 55. The mid-box 20 may at least partially, enclose the at least one storage tank 22.

The second spanning elements 58 may have a first end 60 connected to the second rail portion 46, and a second end 62 connected to the third rail portion 50. At least a portion of the second spanning elements 58 may be lower than the third portion. The rails 40 may include a dip, or indentation at the location of the mid-box 20 to accommodate at least the cylindrically-shaped tank section 38 of the at least one storage tank 22. In some embodiments the vehicle 10 may include a forward bed support 96 that may be modified to support the one or more storage tanks. In some examples the forward bed support 96 may be removed.

Figure 5A:
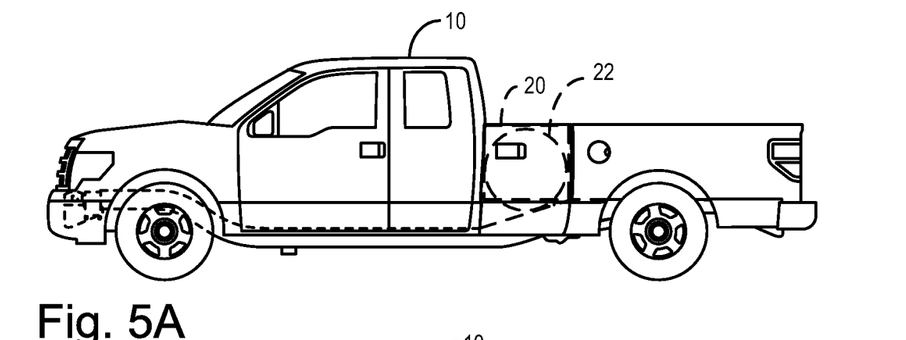
FIGS. 5A-5D are side views illustrating various gaseous fuel storage tank configurations.
Figure 5B:
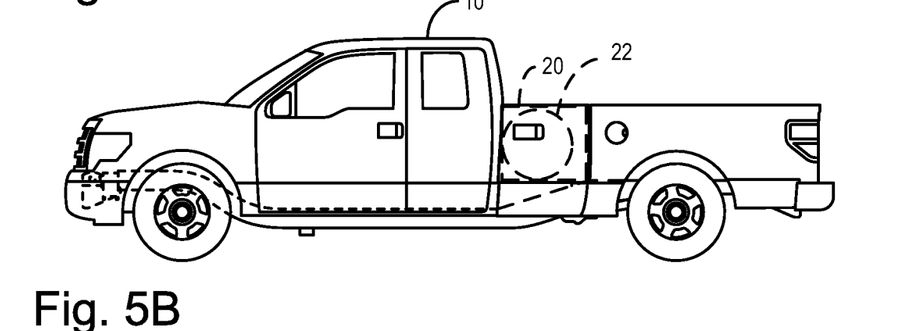
Figure 5C:
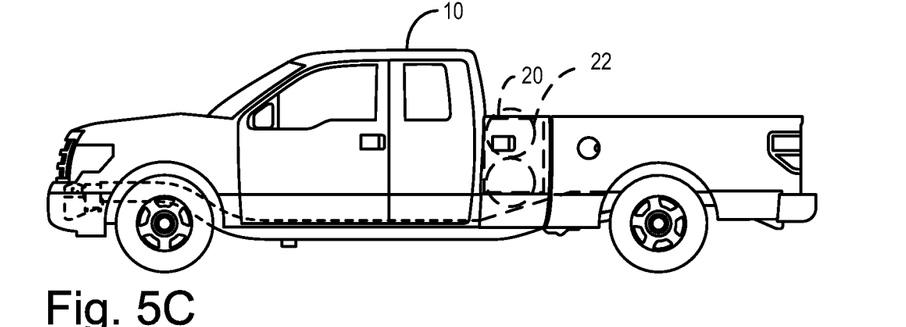
Figure 5D:
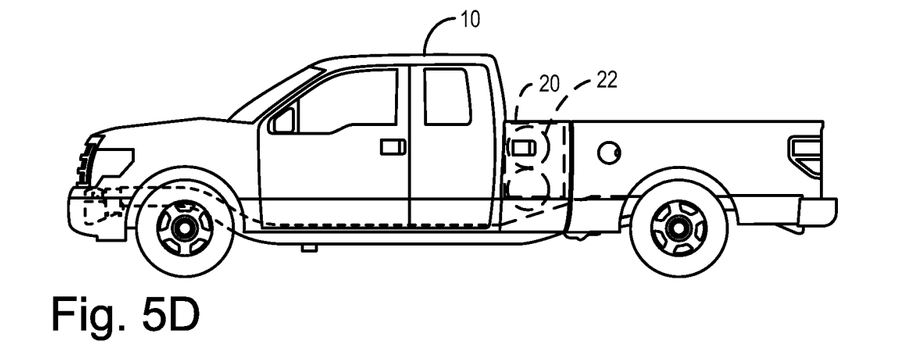

FIGS. 5A-5D are side views illustrating various gaseous fuel storage tank configurations. The storage tanks 22 may be configured in a number of patterns that may maximize the space available in the mid-box 20, and in the vehicle 10. In various embodiments the mid-box 20 may include an open bottom. In some embodiments one or more tanks 22 may protrude outside of the mid-box 20. In this way the spaces between various components of the vehicle may used to advantage. For example, FIG. 5A illustrates a single relatively large storage tank 22 protruding through an opening in the bottom of the mid-box 20. FIG. 5B illustrates a single relatively smaller storage tank 22 configured to fit completely within an opening in the mid-box 20. FIG. 5C illustrates two storage tanks 22, one protruding through an opening in the bottom of the mid-box 20, and another protruding through an opening in the top of the mid-box 20. FIG. 5D illustrates two storage tanks 22, with only one protruding through an opening in the bottom of the mid-box 20. In some examples the portion of the storage tank(s) that may protrude through an opening in the top, and/or the bottom, of the mid-box 20, and/or any related plumbing, may be covered by a close fitting beauty cover.

Figure 6:
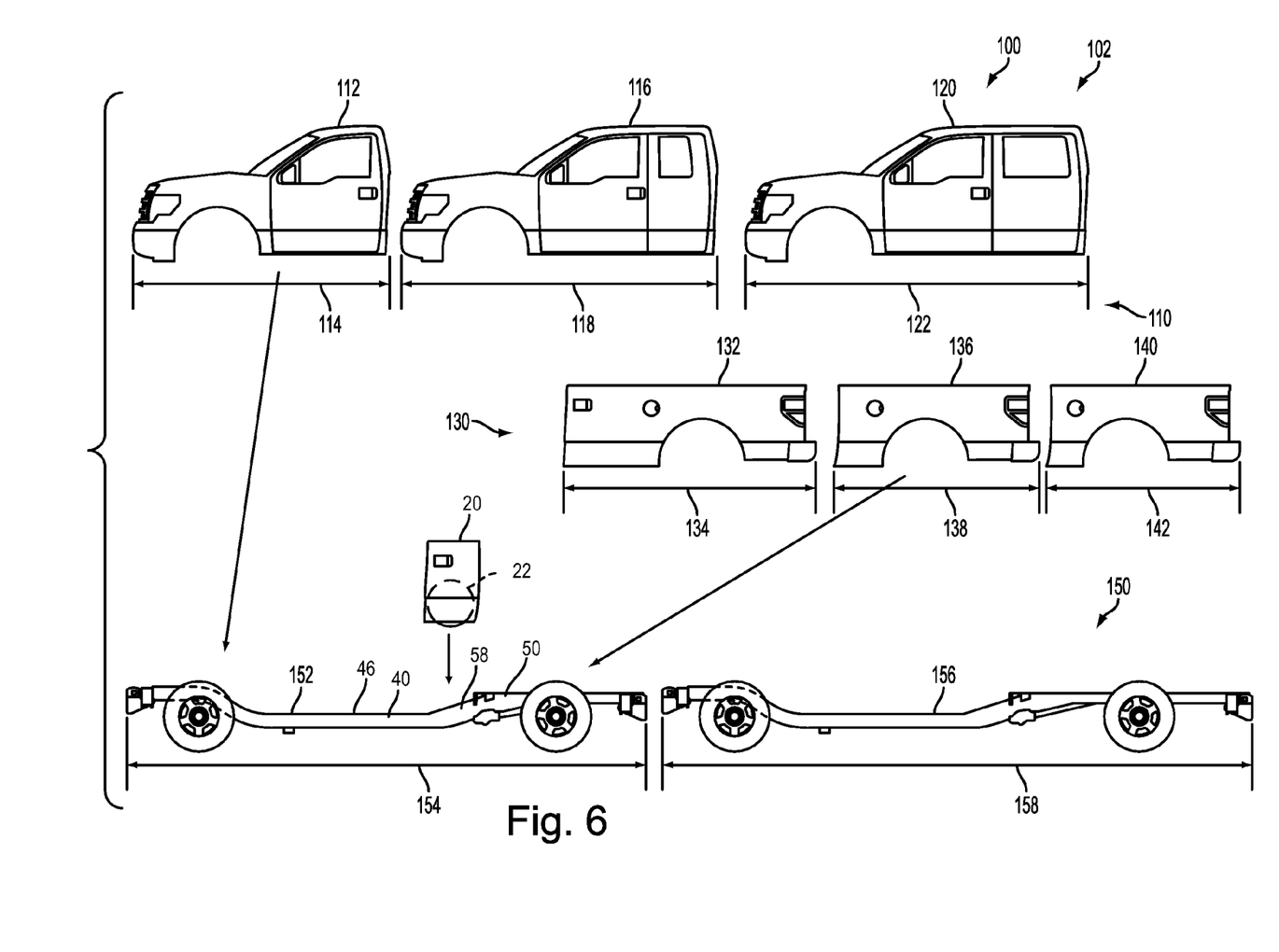
FIG. 6 is a schematic side view showing various configurations of the vehicle.

FIG. 6 is schematic view illustrating a system 100 for assembling pickup trucks. The system 100 may include an inventory 102 of pickup truck parts. The inventory 102 may include a cab sub-inventory 110 including a first cab 112 having a first cab length 114, a second cab 116 having a second cab length 118, and a third cab 120 having a third cab length 120. The inventory 102 may also include a bed sub-inventory 130 including a first bed 132 having a first bed length 134, a second bed 136 having a second bed length 138, and a third bed 140 having a third bed length 142. The inventory 102 may further include a frame sub-inventory 150 including a first frame 152 having a first frame length 154, and a second frame 156 having a second frame length 158. The inventory 102 may be configured to assemble one or both of a first pickup model to include the first frame 152 the first cab 112 and the first bed 132, and a second pickup model to include the second frame 156 the second cab 116 and the second bed 136.

In addition the system 100, and the inventory 102, may be further configured to assemble a third pickup model to include the first frame 152 the first cab 112 and the second bed 136. A mid-box 20 may be positioned between the first cab 112 and the second bed 136. The mid-box 20 including at least one storage tank 22 configured to store a gaseous fuel in a compressed, and/or a compressed liquid state. Other combinations of cabs beds and frames are also possible.

In some example embodiments the inventory 102 may be further configured to assemble a fourth pickup model to include one of the first frame 152 and the second frame 154, and the second cab 116 and the first bed 132. The mid-box 20 may be positioned between the second cab 116 and the first bed 132. The mid-box 20 may include the at least one storage tank 22 configured to store a gaseous fuel in a compressed, and/or a compressed liquid state.

The first frame 152 may include a first and second rail 40 having a lower portion 46, and a higher portion 50 connected by a spanning element 58. The lower portion 46 may be configured to support the cab 112. The higher portion 50 may be configured to support the second bed 136. The least one storage tank 22 may be disposed adjacent the spanning element 58 such that at least portion of the tank is lower than the second bed 136. There may be an opening in the mid-box, and the at least one storage tank 22 may protruding through the opening into a cavity adjacent to, or between one, or more, of the first frame 152, the first cab 112, and the second bed 136. In this way an efficient and cost effective system and method of assembly of a CNG-fueled vehicle with fuel tanks packaged between cab and bed may be built using components that may also be used to build different configured vehicles.

Multiple combinations are possible. For example, a shorter cab than that for which the frame was designed may be used which may create a gap between the cab and bed. Alternatively, a shorter box than that for which the frame was designed may be used which may create a gap between the cab and bed. Examples may include putting a 5.5 foot bed on a truck frame designed for a 8 foot bed to yields a roughly 2.5 foot gap; putting a 5.5 foot bed on a truck frame designed for a 6.5 foot bed to yield a roughly 1.0 foot gap; putting a 6.5 foot bed on a truck frame designed for a 8 foot bed to yield a roughly 1.5 foot gap; putting a regular cab on a truck frame designed for a so called super cab to yields a roughly 1.5 foot gap; putting a regular cab on a truck frame designed for a supercrew to yields a roughly 2.0 foot gap; and putting a super cab on a truck frame designed for a super cab to yields a roughly 0.5 foot gap. The gaps described may be used to position a mid-box to hold one or more gaseous fuel tanks.

Figure 7:
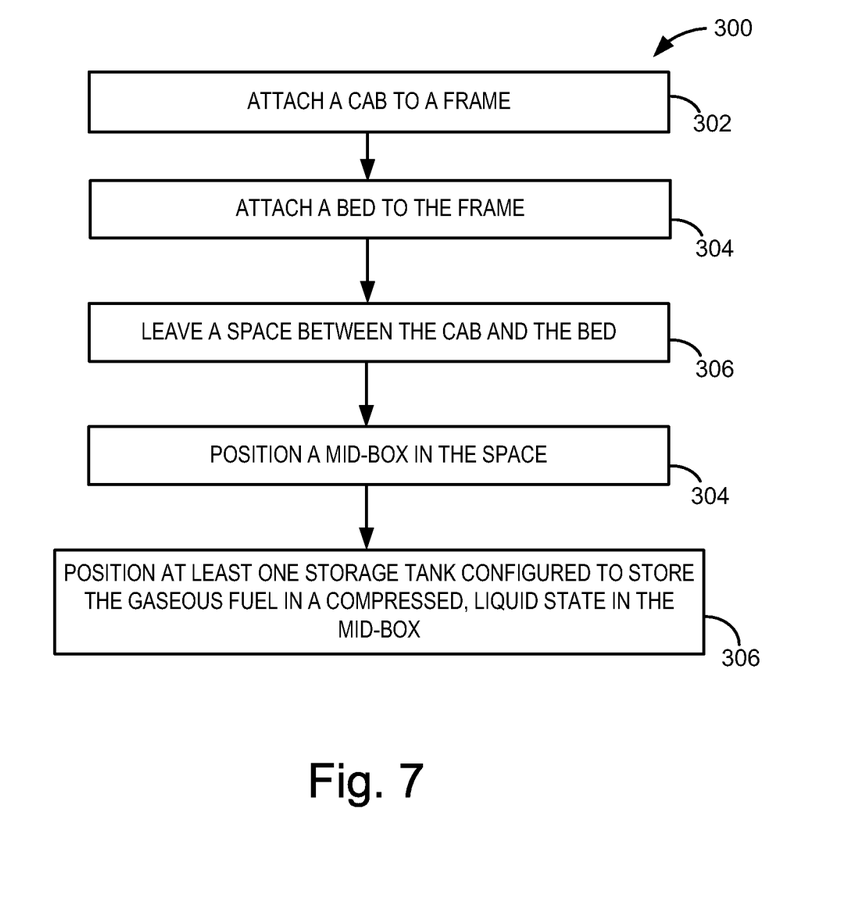
FIGS. 7-8 are flow diagrams showing example manufacturing processes.

FIG. 7 is a flow chart illustrating a method 300 that may be implemented to manufacturing a vehicle having an engine configured to operate on a gaseous fuel. The method 300 may be implemented via the components and systems described above, but alternatively may be implemented using other suitable components. Method 300 may include, at 302, attaching a cab to a frame. The method 300 may also include, at 304, attaching a bed to the frame. The method 300 may also include, at 306, leaving a space between the cab and the bed. The method 300 may also include, at 308, positioning a mid-box in the space. The method 300 may also include, at 310, positioning at least one storage tank configured to store the gaseous fuel in a compressed, liquid state in the mid-box.

Figure 8:
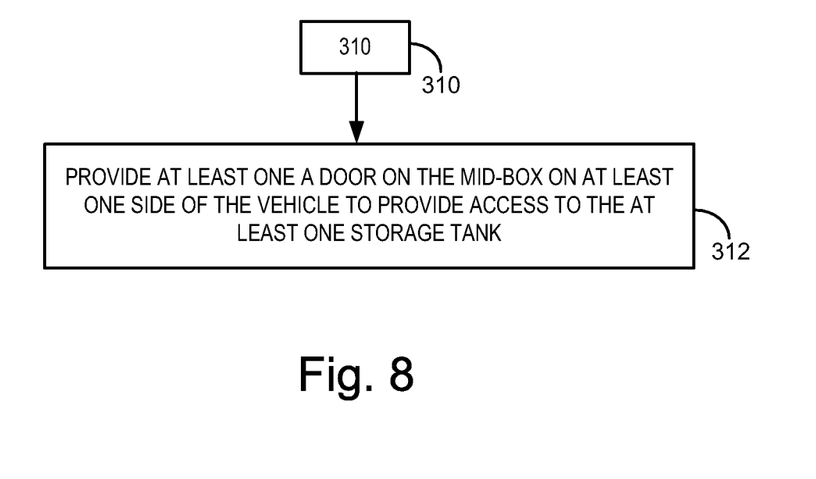

FIG. 8 is a flow chart illustrating an example variation of the method 300. Following from 310 the method 300 may include, at 312, providing at least one a door on the mid-box on at least one side of the vehicle to provide access to the at least one storage tank. The method 300 may further include supporting the at least one storage tank with at least one of a mid-box front wall, a mid-box back wall, a mid-box bottom surface, and a mid-box top surface. The at least one storage tank may be supported with straps, or the like.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle, comprising:
a cab including an engine compartment housing an engine that operates on gaseous fuel;
a bed;
a mid-box between the cab and the bed and including a storage tank to store the fuel in a compressed state; and
a fueling system to supply fuel from the storage tank to the engine;
wherein the fueling system includes a gaseous fuel receiving unit;
wherein the storage tank is transversely mounted inside the mid-box so as to position the gaseous fuel receiving unit adjacent a port access door in a side opening door of the mid-box; and
wherein the gaseous fuel receiving unit includes a CNG fill port.

2. The vehicle of claim 1 wherein the mid-box has a mid-box side body panel positioned between and bordered by a cab side body panel and a bed side body panel, the mid-box side body panel forming the side opening door and providing access to the gaseous fuel receiving unit, the gaseous fuel receiving unit coupled to the storage tank to supply fuel received by the gaseous fuel receiving unit to the storage tank.

3. The vehicle of claim 1 wherein the storage tank includes at least a cylindrically-shaped section.

4. The vehicle of claim 1 wherein the gaseous fuel is natural gas, and the storage tank is configured to store compressed natural gas.

5. The vehicle of claim 1 wherein the mid-box includes a front wall, a back wall, a bottom surface, a top surface, and two side walls, one of the side walls configured with the side opening door providing access to the gaseous fuel receiving unit, and the other side wall configured with a second door, where the back wall of the mid-box is positioned adjacent a front wall of the bed, and the front wall of the mid-box is positioned adjacent a rear wall of the cab, wherein the vehicle is a pick-up truck.

6. The vehicle of claim 1 wherein the engine is a bi-fueled engine configured to operate on the gaseous fuel and a liquid fuel, the vehicle further comprising a liquid fuel tank, the bed including a liquid fuel receiving unit, the liquid fuel receiving unit coupled to the liquid fuel tank.

7. The vehicle of claim 1 wherein the mid-box is coupled to the bed.

8. The vehicle of claim 1 wherein the mid-box is coupled to the cab.

9. The vehicle of claim 2 wherein the mid-box side body panel is colored to match the cab side body panel and the bed side body panel, and where the mid-box side body panel is shaped to form a substantially continuous panel with the cab side body panel and bed side body panel.

10. The vehicle of claim 3 further comprising a pair of rails, the mid-box and the bed mounted on the rails, the rails including an indentation at a location of the mid-box to accommodate the cylindrically-shaped tank section.

11. The vehicle of claim 10 wherein the mid-box includes an open bottom.

12. The vehicle of claim 6 wherein the liquid fuel receiving unit is positioned in a bed side body panel.

13. A vehicle, comprising:
a cab including an engine compartment;
an engine configured to operate on a gaseous fuel located in the engine compartment;
a bed, where the bed is positioned a distance away from the cab, and where at least one storage tank configured to store the fuel in a compressed state is positioned between the bed and the cab within the distance; and
a fueling system configured to supply fuel from the at least one storage tank to the engine;
wherein the fueling system includes a gaseous fuel receiving unit;
wherein the storage tank is transversely mounted inside the mid-box so as to position the gaseous fuel receiving unit adjacent a side opening door in a side wall positioned within the distance; and
wherein the gaseous fuel receiving unit includes a CNG fill port.

14. The vehicle of claim 13 further comprising a mid-box positioned within the distance and including the side wall; the mid-box at least partially enclosing the at least one storage tank.

\* \* \* \* \*